US010487698B2

(12) United States Patent
Guo

(10) Patent No.: US 10,487,698 B2
(45) Date of Patent: Nov. 26, 2019

(54) SUPERCRITICAL FLUID POWER SYSTEM AND CONTROL METHOD THEREFOR

(71) Applicant: Songwei Guo, Minhang Shanghai (CN)

(72) Inventor: Songwei Guo, Minhang Shanghai (CN)

( * ) Notice: Subject to any disclaimer, the term of this patent is extended or adjusted under 35 U.S.C. 154(b) by 221 days.

(21) Appl. No.: 15/528,019

(22) PCT Filed: Nov. 17, 2015

(86) PCT No.: PCT/CN2015/094781
§ 371 (c)(1),
(2) Date: May 18, 2017

(87) PCT Pub. No.: WO2016/078566
PCT Pub. Date: May 26, 2016

(65) Prior Publication Data
US 2018/0347409 A1    Dec. 6, 2018

(30) Foreign Application Priority Data

Nov. 19, 2014 (CN) .......................... 2014 1 0662447

(51) Int. Cl.
*F01K 27/00* (2006.01)
*F01K 25/10* (2006.01)
*F03G 7/05* (2006.01)

(52) U.S. Cl.
CPC .............. *F01K 27/00* (2013.01); *F01K 25/10* (2013.01); *F03G 7/05* (2013.01)

(58) Field of Classification Search
CPC .......... F01K 3/12; F01K 27/005; F01K 25/10; F03G 7/05
See application file for complete search history.

(56) References Cited

U.S. PATENT DOCUMENTS 3,589,126 A * 6/1971 Zotto ...................... F01K 25/00
60/664
4,134,265 A    1/1979 Schlueter
(Continued)

FOREIGN PATENT DOCUMENTS

CN        102661181 A    9/2012
CN        204371437 U    6/2015
(Continued)

OTHER PUBLICATIONS

JP-07019663-A English (Year: 1995).*
(Continued)

*Primary Examiner* — Mark A Laurenzi
*Assistant Examiner* — Shafiq Mian
(74) *Attorney, Agent, or Firm* — Honigman LLP; Matthew H. Szalach; Jonathan P. O'Brien

(57) ABSTRACT

A supercritical fluid power system comprises: a power cycle loop (10) filled with a supercritical fluid working substance and comprising a first pressure container (11), a second pressure container (12), and a driven portion (13) disposed between the two pressure containers; and a hot source (20) and a cold source (30), wherein the hot source (20) is used to provide thermal energy to a working substance in one pressure container, and the cold source (30) is used to cool the working substance in another pressure container, so as to form a pressure difference between the two pressure containers. The working substance flows between the two pressure containers under the effect of the pressure difference and flows to the driven portion (13) to provide power to the driven portion (13). For this power system, a pressure difference is cyclically produced between the two pressure containers, thereby implementing recycling of power.

23 Claims, 5 Drawing Sheets

(56) References Cited

U.S. PATENT DOCUMENTS

| | | | |
|---|---|---|---|
| 5,548,957 A | 8/1996 | Salemie | |
| 6,364,938 B1* | 4/2002 | Birbara | A62B 11/00 95/139 |
| 7,331,180 B2* | 2/2008 | Marnoch | F01K 3/12 60/645 |
| 7,658,072 B2* | 2/2010 | Masada | F01K 23/02 60/670 |
| 9,359,919 B1* | 6/2016 | Berry | F01K 25/106 |
| 9,709,286 B2* | 7/2017 | Vandermeulen | B01D 53/263 |
| 9,797,274 B2* | 10/2017 | Guo | F03G 7/06 |
| 2004/0237525 A1 | 12/2004 | Stock | |
| 2006/0059912 A1 | 3/2006 | Romanelli et al. | |
| 2008/0127649 A1* | 6/2008 | Marnoch | F01K 3/12 60/650 |
| 2010/0011760 A1 | 1/2010 | Scampini | |
| 2011/0139407 A1 | 6/2011 | Ohler et al. | |
| 2012/0006023 A1* | 1/2012 | Johnson | F01K 3/12 60/645 |
| 2012/0132513 A1* | 5/2012 | Vandermeulen | B01D 53/263 202/175 |
| 2013/0118170 A1* | 5/2013 | Mierisch | F01K 3/12 60/659 |
| 2013/0180686 A1* | 7/2013 | Campbell | G05D 16/202 165/104.19 |
| 2016/0040560 A1* | 2/2016 | Hariri | F01K 25/02 60/671 |
| 2018/0187572 A1* | 7/2018 | Apte | F01K 3/12 |
| 2018/0283747 A1* | 10/2018 | Ma | F25B 21/02 |

FOREIGN PATENT DOCUMENTS

| | | |
|---|---|---|
| DE | 10133153 C1 | 7/2002 |
| EP | 2157317 A2 | 2/2010 |
| JP | 07019663 A * | 1/1995 |
| WO | WO-2005088080 A1 | 9/2005 |

OTHER PUBLICATIONS

European Patent Office, Extended European Search Report for EP Application No. 15861627.6, dated Jun. 6, 2018.

State Intellectual Property Office of the P.R.C. as the International Searching Authority, International Search Report for PCT Application No. PCT/CN2015/094781, dated Feb. 23, 2016.

* cited by examiner

SUPERCRITICAL FLUID POWER SYSTEM AND CONTROL METHOD THEREFOR

CROSS-REFERENCE TO RELATED APPLICATIONS

This application is the national phase of International Application No. PCT/CN2015/094781, filed on Nov. 17, 2015, which claims the benefit of priority to Chinese Patent Application No. 201410662447.5, filed on Nov. 19, 2014, and entitled "SUPERCRITICAL EFFICIENT POWER GENERATION SYSTEM", the entire disclosures of which are incorporated herein by reference.

TECHNICAL FIELD

The present disclosure generally relates to a supercritical fluid power system and a control method thereof, and more particularly, to a supercritical fluid power generation system.

BACKGROUND

As we know, at present, power generation is a production process of converting, using a power generation device, thermal energy and nuclear energy of petrochemical fuel (such as coal, oil and natural gas) into electrical energy supplied for needs of various departments of national economy and people's life. However, petrochemical fuel can produce large amounts of carbon dioxide, which exacerbates the global greenhouse effect. Besides, nuclear energy faces great challenges of source of raw materials and environmental protection.

Those skilled in the art have begun to use solar energy, wind energy, geothermal energy, water energy (including marine energy) and other clean energies for power generation. However, solar energy and wind energy are seriously affected by climatic conditions, and geothermal energy and water energy (including ocean energy) are subject to harsh geographical conditions as well. Therefore, these energies cannot be popularized on a large scale. Furthermore, long-term development of the ocean energy is prone to result in ecological disasters.

Therefore, a kind of energy which is cheap and can be widely collected is needed. As a result, ubiquitous air, oceans, lakes and rivers come into people's sight. As all the energies on the surface of the earth substantially come from the sun (energy caused by volcanic eruption is relatively weak and can be negligible), the energy of the sun's rays is heating air, oceans, lakes and rivers all the time. If the energy can be extracted for human use, it will no longer have the problem of emissions of carbon dioxide, ecological disasters and the problem of scarcity of resources. Besides, the energy will no longer be subject to climatic conditions and geographical conditions.

For the above reasons, a variety of power generation devices making use of air or liquid have been developed, where air or liquid thermal energy is used to make working fluids having a low boiling point in a vessel be gasified, and then high pressure steam generated is used to drive a generator to generate power through a turbine. However, at present, such devices are basically required to realize liquefaction recycling of the working fluids by means of a refrigeration compressor and a booster pump. The problems lie in that, on one hand, as the refrigeration needs to face enormous liquefaction potential, it is infeasible to use the refrigeration compressor to liquefy the working fluids, and on the other hand, even if there is a ready-made cold source, using the booster pump to make the working fluids back into a high pressure area costs highly. Therefore, the devices have too low overall efficiency and cannot be applied in practice. In addition, such devices have special requirements on working conditions, that is, they require a temperature difference, and the greater temperature difference the better. The devices cannot work in the case of no temperature difference. In view of the above situations, it is necessary to improve the power generation devices, to improve the efficiency of power generation and finally realize all-weather, all-earth and full-time power generation and even provide power under no temperature difference conditions.

SUMMARY

In embodiments of the present disclosure, power generation has higher efficiency and does not require a temperature difference, and all-weather, all-earth and full-time power generation is realized.

In an embodiment of the present disclosure, a supercritical fluid power system is provided, including: a power cycle loop filled with a working substance, wherein the working substance is a supercritical fluid when flowing in the power cycle loop, and the power cycle loop includes a first pressure vessel, a second pressure vessel, and a driven portion disposed between and connected with the first and second pressure vessels; and a heat source and a cold source, wherein the heat source is configured to provide thermal energy to the working substance in one of the first and second pressure vessels, to increase a pressure in the one pressure vessel, a temperature output by the heat source is higher than a critical temperature of the working substance, and the cold source is configured to cool the working substance in the other of the first and second pressure vessels, to reduce a pressure in the other pressure vessel, and wherein the heat and cold sources cooperate to form a pressure difference between the first and second pressure vessels, and the working substance flows between the first and second pressure vessels under the effect of the pressure difference, and flows through the driven portion to provide power to the driven portion.

Optionally, the heat source may be configured to provide thermal energy to the working substance in the first pressure vessel and the second pressure vessel alternately, and the cold source may be configured to cool the working substance in the first pressure vessel and the second pressure vessel alternately.

Optionally, the working substance may have a low boiling point.

Optionally, the critical temperature of the working substance having the low boiling point may be Tc which is not higher than 100° C.

Optionally, the critical temperature of the working substance having the low boiling point may be Tc within a range from −272° C. to 100° C.

Optionally, a pressure in the power cycle loop may be greater than a critical pressure of the working substance.

Optionally, the first pressure vessel and the second pressure vessel may use the heat source in common.

Optionally, the power cycle loop may include a first heating branch and a second heating branch, wherein two ends of the first heating branch are connected with the first pressure vessel respectively, two ends of the second heating branch are connected with the second pressure vessel respectively, and the first and second heating branches pass by the heat source respectively.

Optionally, a control valve may be disposed in the first and second heating branches respectively, and configured to control the corresponding heating branch to be connected when the corresponding heating branch needs thermal energy and to be disconnected when the corresponding heating branch does not need thermal energy.

Optionally, a transport pump may be disposed in the first and second heating branches respectively, operates when the corresponding heating branch needs thermal energy, and stops operation when the corresponding heating branch does not need thermal energy.

Optionally, the heat source may be a first natural substance.

Optionally, the first pressure vessel and the second pressure vessel may use the cold source in common.

Optionally, the power cycle loop may include a first cooling branch and a second cooling branch, wherein two ends of the first cooling branch are connected with the first pressure vessel respectively, two ends of the second cooling branch are connected with the second pressure vessel respectively, and the first and second cooling branches pass by the cold source respectively.

Optionally, a control valve may be disposed in the first and second cooling branches respectively, and configured to control the corresponding cooling branch to be connected when the corresponding cooling branch needs to be cooled and to be disconnected when the corresponding cooling branch does not need to be cooled.

Optionally, a transport pump may be disposed in the first and second cooling branches respectively, operates when the corresponding cooling branch needs to be cooled, and stops operation when the corresponding cooling branch does not need to be cooled.

Optionally, the cold source may be a second natural substance.

Optionally, each of the first pressure vessel and the second pressure vessel may be provided with the heat source and the cold source.

Optionally, the heat source and the cold source may be equipped inside or outside of the corresponding pressure vessel.

Optionally, the heat source may include: a first fluid which is not communicated with the working substance; a first heat exchanger including a first chamber and a second chamber which are separated from each other, wherein the first chamber is connected with the power cycle loop for the working substance to flow; and a heat pump, wherein an output end of the heat pump is connected with the second chamber, and the heat pump is configured to extract thermal energy of the first fluid and transport the extracted thermal energy to the second chamber, so as to exchange heat with the working substance.

Optionally, when the first fluid is a liquid, a transport pump is provided at an input end of the heat pump to speed the flow of the first fluid to the heat pump; and when the first fluid is a gas, a fan is provided at the input end of the heat pump to speed the flow of the first fluid to the heat pump.

Optionally, when the first fluid is a fluid, a transport pump is provided at an input end of the heat pump to speed the flow of the first fluid to the heat pump; and when the first fluid is a gas, a fan is provided at the input end of the heat pump to speed the flow of the first fluid to the heat pump.

Optionally, the first heat exchanger may include a heat pipe, a tubular heat exchanger or a plate heat exchanger.

Optionally, the cold source may include: a second fluid which is not communicated with the working substance; a second heat exchanger including a third chamber and a fourth chamber which are separated from each other, wherein the third chamber is connected with the power cycle loop for the working substance to flow; and a refrigerator group, wherein an output end of the refrigerator group is connected with the fourth chamber, and the refrigerator group is configured to extract thermal energy of the working fluid and release the extracted thermal energy to the second fluid.

Optionally, the second fluid may be a fluid existing in natural environment, or an obtainable liquid or gas having a relatively low temperature, such as an exhausted liquid or gas produced in industrial manufacturing or daily life.

Optionally, the cold source may further include a spraying device for cooling a condenser of the refrigerator group.

Optionally, the second heat exchanger may include a heat pipe, a tubular heat exchanger or a plate heat exchanger.

Optionally, when the heat source includes a first fluid and a heat pump for extracting thermal energy of the first fluid, a first channel for flowing of the first fluid is provided between the heat source and the cold source, wherein the first fluid flowing out of the heat source through the first channel serves as the second fluid to flow into the cold source.

Optionally, a second channel for flowing of the second fluid is provided between the heat source and the cold source, wherein the second fluid flowing out of the cold source through the second channel serves as supplement of the first fluid to flow into the heat source.

Optionally, the driven portion may have an entrance and an exit for transit of the working substance, the first pressure vessel, the second pressure vessel and the driven portion are connected with each other via a first unidirectional branch and a second unidirectional branch, wherein each unidirectional branch is provided for the working substance to flow from the entrance to the exit, and the working substance flows in the first unidirectional branch and the second unidirectional branch alternately according to the pressure difference.

Optionally, a control valve may be disposed in the first and second unidirectional branches respectively, to control connectivity of the corresponding branch.

Optionally, the driven portion may be a power generation device or a power transmission device.

Optionally, a pressure sensor may be disposed in each of the first and second pressure vessels for detecting an inner pressure in the corresponding pressure vessel and outputting a signal of the detected inner pressure.

Optionally, the supercritical fluid power system may further include a control device configured to receive the signal of the detected inner pressure output by the pressure sensor and send a first instruction or a second instruction based on the signal of the detected inner pressure, wherein the first instruction controls the heat source to provide thermal energy to the working substance in the first pressure vessel and the cold source to cool the working substance in the second pressure vessel, and the second instruction controls the heat source to provide thermal energy to the working substance in the second pressure vessel and the cold source to cool the working substance in the first pressure vessel.

Optionally, the supercritical fluid power system may include a plurality of first pressure vessels and a plurality of second pressure vessels, wherein each of the plurality of first pressure vessels corresponds to one of the plurality of second pressure vessels to form a plurality of pressure vessel groups each of which includes one first pressure vessel and one second pressure vessel, and the heat source and the cold source serve for at least one pressure vessel group in a same time period.

Optionally, in different time periods, the heat source and the cold source may serve for different pressure vessel groups.

Optionally, the working substance having a low boiling point may include hydrogen, nitrogen, oxygen, ozone, carbon dioxide, carbon monoxide, nitrogen dioxide, hydrogen chloride, hydrogen sulfide, bromine, ammonia, methane, ethane, ethylene, acetylene, chlorine, helium, neon, argon, krypton, xenon, radon, deuterium, nitric oxide, nitrous oxide, fluorine, boron fluoride, diborane or air.

In an embodiment of the present disclosure, a method for controlling any one of the above supercritical fluid power systems is provided, including: at an initial time period, controlling the heat source to provide thermal energy to the working substance in the first pressure vessel and the second pressure vessel, so as to convert the working substance in the power cycle loop into a supercritical fluid; obtaining a pressure rise rate in the first pressure vessel and the second pressure vessel, or obtaining a pressure in the first pressure vessel and the second pressure vessel; and when the pressure rise rate is less than a predetermined rate or the pressure is greater than a predetermined pressure, controlling the heat source to continue providing thermal energy to the working substance in one of the first and second pressure vessels which the heat source serves or controlling the cold source to cool the working substance in the other of the first and second pressure vessels, to form a pressure difference between the first pressure vessel and the second pressure vessel, or, controlling the heat source to continue providing thermal energy to the working substance in one of the first and second pressure vessels which the heat source serves and controlling the cold source to cool the working substance in the other of the first and second pressure vessels, to form a pressure difference between the first pressure vessel and the second pressure vessel.

Optionally, during the forming of the pressure difference, a channel between the driven portion and the first pressure vessel, and a channel between the driven portion and the second pressure vessel may be connected, so that the working substance is capable of flowing from one pressure vessel to the other pressure vessel through the driven portion; or during the forming of the pressure difference, the channel between the driven portion and the first pressure vessel, and the channel between the driven portion and the second pressure vessel may be disconnected, and the channels may be connected when the pressure difference reaches a predetermined pressure difference.

Optionally, when the working substance flows from one pressure vessel to the other pressure vessel through the driven portion, the method may further include: obtaining a first pressure in the first pressure vessel and a second pressure in the second pressure vessel; obtaining a difference between the first pressure and the second pressure; and if the difference is less than a predetermined difference, controlling one of the heat source and the cold source to stop serving the pressure vessel, and the other of the heat source and the cold source to exchange the pressure vessel to be served, to form a reversed pressure difference, or controlling the heat source and the cold source to exchange the pressure vessels they serve, to form a reversed pressure difference.

Optionally, when the working substance flows from one pressure vessel to the other pressure vessel through the driven portion, the method may further include: obtaining a pressure change rate in the first pressure vessel and the second pressure vessel; and if the pressure change rate is less than a predetermined change rate, controlling one of the heat source and the cold source to stop serving the pressure vessel, and the other of the heat source and the cold source to exchange the pressure vessel to be served, to form a reversed pressure difference, or controlling the heat source and the cold source to exchange the pressure vessels they serve, to form a reversed pressure difference.

Optionally, the heat source may include a heat pump, the cold source may include a refrigerator group, and when the working substance flows from one pressure vessel to the other pressure vessel through the driven portion, the method may further include: obtaining a practical consuming power of at least one of the heat pump and the refrigerator group; when the practical consuming power is greater than a predetermined power, controlling one of the heat source and the cold source to stop serving the pressure vessel, and the other of the heat source and the cold source to exchange the pressure vessel to be served, to form a reversed pressure difference, or controlling the heat source and the cold source to exchange the pressure vessels they serve, to form a reversed pressure difference.

Embodiments of the present disclosure may provide following advantages. In the supercritical fluid power system provided in embodiments of the present disclosure, the power cycle loop includes the first and second pressure vessels which are connected via a driven portion disposed therebetween. The supercritical fluid working substance in each pressure vessel may be heated by the heat source to obtain an increased temperature or an increased pressure, or may be cooled by the cold source to obtain a reduced temperature or a reduced pressure. By utilizing a natural law that pressures of a supercritical fluid working substance greatly vary with temperatures, heat exchange is performed between the supercritical fluid working substance and the heat source to increase the temperature and pressure in one pressure vessel. Afterwards, the cold source is configured to reduce the temperature and pressure in the other pressure vessel, so that a pressure difference is formed between the first and second pressure vessels. The pressure difference makes the working substance flow between the two pressure vessels through the driven portion to provide power to the driven portion for power generation or other needs.

Further, heating and cooling to the working substance in the first and second pressure vessels form the pressure difference. By employing the pressure vessels which are served by the heat source and the cold source alternately instead of conventional booster pump, the pressure difference is formed between the two pressure vessels circularly, which realizes recycle of power.

Further, the heat source may be a heat pump with a high Energy Efficiency Ratio (EER) and the cold source may be a refrigerator group, which may lead to less power consumption and form a greater pressure difference to provide much greater power. By employing the combination of the heat pump, the refrigerator group and the supercritical fluid technology, negative effects caused by a small temperature difference between a pressure boosting end and a depressurization end, or change of air temperature or water temperature may be avoided. Compared with existing techniques, the supercritical fluid power system provided in embodiments of the present disclosure may not be affected by outside environment and may provide all-weather and round-the-clock power.

DETAILED DESCRIPTION

To solve problems in the existing techniques, embodiments of the present disclosure provide a supercritical fluid power system, and more particularly, a supercritical fluid power generation system, where a working substance preferably has a low boiling point and can be in a supercritical fluid state at a room temperature.

In order to clarify the object, characteristic and advantages of embodiments of the present disclosure, embodiments of present disclosure will be described clearly in detail in conjunction with accompanying drawings.

Figure 1:
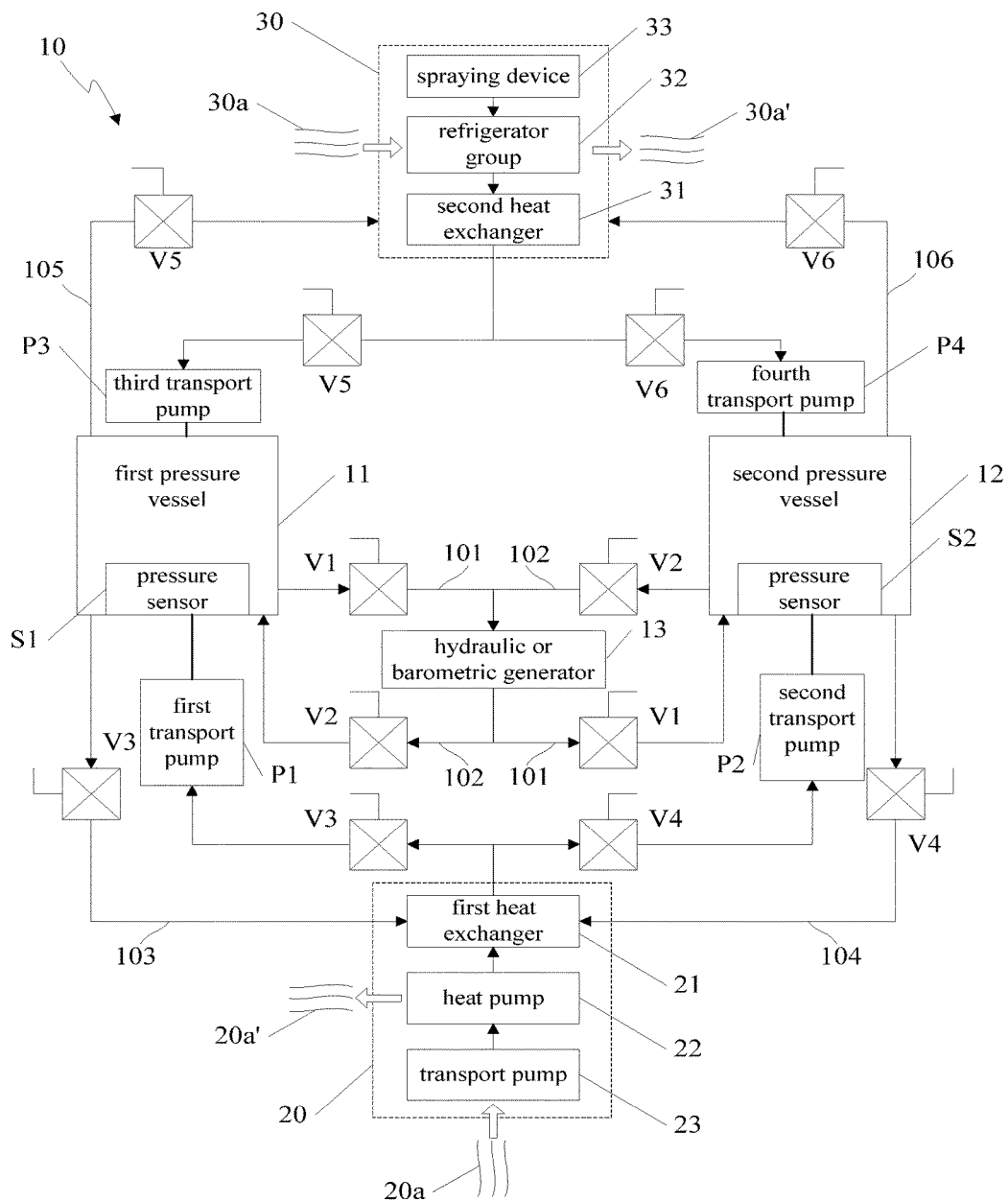
FIG. 1 schematically illustrates a structural diagram of a supercritical fluid power system according to an embodiment.

In an embodiment, a supercritical fluid power system is provided. Referring to FIG. 1, the supercritical fluid power system includes a power cycle loop 10 filled with a working substance. The working substance is a supercritical fluid when flowing in the power cycle loop 10, that is, the working substance is in a supercritical fluid state when flowing in the power cycle loop 10.

The words "supercritical fluid" and "working substance" are explained briefly below.

The supercritical fluid (SCF) is any fluid at a temperature and pressure above its critical point. Substance presents different states, such as liquid, vapor or solid, under different temperatures and pressures. The critical temperature Tc of a substance is the temperature at and above which vapor of the substance cannot be liquefied, no matter how much pressure is applied. The critical pressure Pc of a substance is the pressure required to liquefy a gas at its critical temperature. At the critical points, properties of the fluid, such as density, viscosity, solubility or permittivity, may change rapidly. When the substance is at a temperature above the critical temperature and a pressure above the critical pressure, the substance is in a supercritical state.

The working substance denotes to an intermediate substance which enables thermal energy and mechanical energy to be converted into each other.

Still referring to FIG. 1, the power cycle loop 10 includes a first pressure vessel 11, a second pressure vessel 12, and a driven portion 13 disposed between and connected with the first and second pressure vessels.

The supercritical fluid power system further includes a heat source 20 and a cold source 30. The heat source 20 is configured to increase a temperature and a pressure of the working substance in the first pressure vessel 11 or the second pressure vessel 12, and the cold source 30 is configured to reduce a temperature and a pressure of the working substance in the first pressure vessel 11 or the second pressure vessel 12. The heat source 20 and the cold source 30 cooperate in a way that the heat source 20 makes pressure increased in one pressure vessel and the cold source 30 makes pressure decreased in the other pressure vessel, to form a pressure difference between the first and second pressure vessels. The working substance flows between the first and second pressure vessels under the effect of the pressure difference, and flows through the driven portion 13 to provide power to the driven portion 13.

In some embodiments, the heat source 20 is configured to provide thermal energy to the working substance in one of the first and second pressure vessels, to increase a pressure in the one pressure vessel. A temperature output by the heat source 20 is higher than a critical temperature of the working substance, so that the working substance is heated to reach a temperature above the critical temperature, which makes pressure in the corresponding pressure vessel increased. The cold source 30 is configured to cool the working substance in the other of the first and second pressure vessels, to reduce a pressure in the other pressure vessel.

From above, the heat source 20 is to increase pressure, specifically, the pressure of the working substance in the corresponding pressure vessel. Under the effect of the heat source 20, the substance in the power cycle loop 10 may present a supercritical fluid state. As the heat source 20 works continuously, the pressure of the working substance in the corresponding pressure vessel may increase continuously, until the temperature of the working substance equals the temperature of the heat source 20. During the normal operation of the system (not including an initialization stage of the system), the lowest working pressure in the power cycle loop 10 is larger than the critical pressure of the working substance, where the lowest working pressure may be predetermined or reached after the heating to the working substance by the heat source 20. It indicates that largest pressures which the first pressure vessel 11, the second pressure vessel 12 and each connection channel can suffer should be larger than the critical pressure of the working substance. Besides, the cold source 30 is to reduce pressure, specifically, the pressure of the working substance in the corresponding pressure vessel. Under the continuous effect of the cold source 30, the pressure of the working substance in the corresponding pressure vessel may be decreased continuously, until the temperature of the working substance equals the temperature of the cold source 30.

The working substance flows from one pressure vessel to the other pressure vessel through the driven portion 13 under the effect of the pressure difference, to provide power for driving the driven portion 13. The driven portion 13 may be a power conversion device or a power transmission device. The power conversion device may be a power generation device, such as a hydraulic generator or a barometric generator. The power transmission device may be any device for transmitting power. For example, if the supercritical fluid power system is applied in a ship, the power transmission device may be a propeller.

In some embodiments, the driven portion 13 may be a power generation device, where the supercritical fluid power system is a supercritical fluid power generation system. When density of the working substance in the supercritical fluid state approximates to that of a liquid, the power generation device is preferably a hydraulic generator. When density of the working substance in the supercritical fluid state approximates to that of a gas, the power generation device is preferably a barometric generator which at least includes a turbine.

From above, by utilizing a natural law that pressures of a supercritical fluid working substance greatly vary with temperatures, heat exchange is performed between the supercritical fluid working substance and the heat source to increase the temperature and pressure in one pressure vessel. Afterwards, the cold source is configured to reduce the temperature and pressure in the other pressure vessel, so that a pressure difference is formed between the first and second pressure vessels. The pressure difference makes the working substance flow between the two pressure vessels through the driven portion to provide power to the driven portion.

Further, heating and cooling to the working substance in the first and second pressure vessels form the pressure difference, which may save power consumption. By employing the pressure vessels which are served by the heat source and the cold source alternately instead of conventional booster pump, the pressure difference is formed between the two pressure vessels circularly, which realizes recycle of power.

Still referring to FIG. 1, a hydraulic generator or a barometric generator which serves as the driven portion 13 has an entrance and an exit for transit of the working substance. When flowing through the hydraulic generator or the barometric generator, a flowing direction of the working substance in the hydraulic generator or the barometric generator is single, that is, the working substance should flow into the hydraulic generator or the barometric generator through the entrance, and flow out of the hydraulic generator or the barometric generator through the exit. As a result, two unidirectional branches should be formed among the first pressure vessel 11, the driven portion 13 and the second pressure vessel 12. If a reversing device is set in the driven portion 13, or an entrance and an exit are not strictly defined in the driven portion 13, one branch which goes through the driven portion 13 may be formed between the first and second pressure vessels.

In some embodiments, the first pressure vessel 11, the second pressure vessel 12 and the driven portion 13 are connected with each other via a first unidirectional branch 101 and a second unidirectional branch 102, where each unidirectional branch is provided for the working substance to flow from the entrance to the exit of the hydraulic generator or the barometric generator.

The working substance flows through the first unidirectional branch 101 and the second unidirectional branch 102 alternately according to the pressure difference. Specifically, when the pressure of the first pressure vessel 11 is greater than the pressure of the second pressure vessel 12, the working substance flows from the first pressure vessel 11 to the second pressure vessel 12 through the first unidirectional branch 101. When the pressure of the first pressure vessel 11 is smaller than the pressure of the second pressure vessel 12, the working substance flows from the second pressure vessel 12 to the first pressure vessel 11 through the second unidirectional branch 102. That is to say, the working substance only flows in one unidirectional branch at a same time period. It is impossible for the working substance to flow in the two unidirectional branches at the same time. When the driven portion 13 does not work or working conditions are not met, the working substance flows through any one of the two unidirectional branches.

In some embodiments, a control valve may be disposed in the first and second unidirectional branches respectively, to control connectivity of the corresponding branch. The control valve in the first unidirectional branch 101 is the first control valve V1, and the control valve in the second unidirectional branch 102 is the second control valve V2. When the first control valve V1 is opened, the first unidirectional branch 101 is connected, and when the second control valve V2 is opened, the second unidirectional branch 102 is connected. As the first unidirectional branch 101 and the second unidirectional branch 102 are connected alternately, the first control valve V1 and the second control valve V2 should not be opened at the same time. That is to say, if one of the first control valve V1 and the second control valve V2 is opened, the other one should not be opened. When the driven portion 13 does not need to work or working conditions are not met, both the first control valve V1 and the second control valve V2 are closed.

In some embodiments, the first control valve V1 and the second control valve V2 may be a unidirectional valve which is capable of controlling the unidirectional connectivity of a channel, or any other valve which is capable of controlling the connectivity of a channel. The number of the first control valve V1 or the second control valve V2 may be one or more. In the embodiment, there are two first control valves V1 and two second control valves V2. The two first control valves V1 are disposed on a first portion of the first unidirectional branch 101 which is between the first pressure vessel 11 and the driven portion 13, and on a second portion of the first unidirectional branch 101 which is between the driven portion 13 and the second pressure vessel 12, respectively. The two second control valves V2 are disposed on a first portion of the second unidirectional branch 102 which is between the first pressure vessel 11 and the driven portion 13, and on a second portion of the second unidirectional branch 102 which is between the driven portion 13 and the second pressure vessel 12, respectively.

It should be noted that, the above description "the working substance is a supercritical fluid when flowing in the power cycle loop 10" means that the working substance presents the supercritical fluid state when the supercritical fluid power system is in the normal operation state which does not include an initialization state or a halted state. When the supercritical fluid power system is in the initialization state or the halted state, the working substance may have a temperature below the critical temperature and a pressure below the critical pressure, that is, the working substance may be not in a supercritical fluid state.

Under the effect of the heat source 20, the working substance becomes the supercritical fluid. Under the effect of the cold source 30, the temperature and pressure of the working substance in the corresponding pressure vessel are decreased but not below the critical temperature and the critical pressure. That is, the working substance in the corresponding pressure vessel which the cold source 30 serves is still the supercritical fluid, to ensure the working substance in the power cycle loop 10 to present the supercritical fluid state during the operation of the supercritical fluid power system.

Theoretically, the working substance may be any substance as long as the power cycle loop 10 and the heat source 20 can make the temperature and the pressure of the working substance above the critical temperature and the critical pressure respectively. However, in consideration of an EER, the working substance in the power cycle loop 10 may have a low boiling point. In some embodiments, the critical temperature of the working substance having the low boiling point may be Tc which is not greater than 100° C. In some embodiments, the critical temperature of the working substance having the low boiling point may be Tc which is within a range from −272° C. to 100° C. In some embodiments, the working substance having the low boiling point may include hydrogen, nitrogen, oxygen, ozone, carbon dioxide, carbon monoxide, nitrogen dioxide, hydrogen chloride, hydrogen sulfide, bromine, ammonia, methane, ethane, ethylene, acetylene, chlorine, helium, neon, argon, krypton, xenon, radon, deuterium, nitric oxide, nitrous oxide, fluorine, boron fluoride, diborane or air. In some embodiments, the working substance having the low boiling point can be in the supercritical fluid state at a room temperature, that is, its critical temperature is below the room temperature.

In some embodiments, during the normal operation of the system, the heat source 20 may be configured to provide thermal energy to the working substance in the first pressure vessel 11 and the second pressure vessel 12 alternately, and the cold source 30 may be configured to cool the working substance in the first pressure vessel 11 and the second pressure vessel 12 alternately. That is, during the normal operation of the system (not including an initialization stage of the system), the heat source 20 or the cold source 30 cannot serve the first pressure vessel 11 and the second pressure vessel 12 at the same time. Instead, the heat source 20 or the cold source 30 can serve only one of the first and second pressure vessels in a time period.

Referring to FIG. 1, if the heat source 20 serves the first pressure vessel 11, the cold source 30 can only serve the second pressure vessel 12. If the heat source 20 serves the second pressure vessel 12, the cold source 30 can only serve the first pressure vessel 11. In this way, the pressure in one pressure vessel may increase while the pressure in the other pressure vessel may decrease, so as to form a pressure difference. When branches between among the driven portion 13, the first pressure vessel 11 and the second pressure vessel 12 are connected, the working substance will flow from the high-pressure area to the low-pressure area through the driven portion 13 under the effect of the pressure difference, so that power is provided to the driven portion 13 to drive the hydraulic generator or the barometric generator to generate power.

In some embodiments, the heat source 20 and the cold source serve different pressure vessels at the same time, so as to form a great pressure difference between the two pressure vessels within a short time period. In this way, relatively large power can be provided to the hydraulic generator or the barometric generator serving as the driven portion 13, to meet requirements of large power.

In some embodiments, the driven portion 13 may be other power transmission device. The heat source 20 and the cold source 30 may be set in other operation mode according to power to be required. For example, when the heat source 20 serves one pressure vessel, the cold source 30 does not work, where a pressure difference is formed by increasing the pressure in only one pressure vessel. This mode is particularly adapted for a situation that the pressure in the two pressure vessels is relatively low and a pressure rise rate is relatively high. For another example, when the cold source 30 serves one pressure vessel, the heat source 20 does not work, where a pressure difference is formed by reducing the pressure in only one pressure vessel. This mode is particularly adapted for a situation that the pressure in the two pressure vessels is relatively high and a pressure decreasing rate is relatively high.

Figure 4:
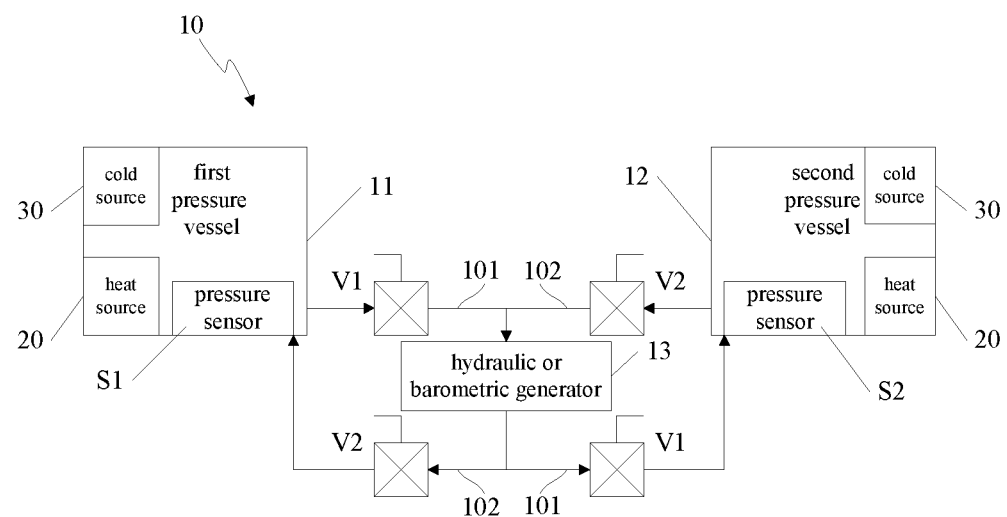
FIG. 4 schematically illustrates a structural diagram of a supercritical fluid power system according to an embodiment.

In some embodiments, each of the first pressure vessel 11 and the second pressure vessel 12 may be provided with the heat source 20 and the cold source 30 (as shown in FIG. 4). In some embodiments, the first pressure vessel 11 and the second pressure vessel 12 may use the heat source 20 or the cold source 30 in common. In some embodiments, the first pressure vessel 11 and the second pressure vessel 12 may use the heat source 20 and the cold source 30 in common.

In the embodiment, the first pressure vessel 11 and the second pressure vessel 12 use the heat source 20 and the cold source 30 in common.

Still referring to FIG. 1, in some embodiments, the power cycle loop 10 may include a first heating branch 103 and a second heating branch 104, wherein two ends of the first heating branch 103 are connected with the first pressure vessel 11 respectively, two ends of the second heating branch 104 are connected with the second pressure vessel 12 respectively, and the first and second heating branches pass by the heat source 20 respectively.

In some embodiments, the working substance may also be filled into the first heating branch 103 and the second heating branch 104, where the working substance in the first heating branch 103 can be exchanged with the working substance in the first pressure vessel 11, and the working substance in the second heating branch 104 can be exchanged with the working substance in the second pressure vessel 12. When the first heating branch 103 passes by the heat source 20, the temperature and the pressure of the working substance in the first heating branch 103 may be increased, and the working substance may flow towards the first pressure vessel 11 which has a relatively low pressure to realize the exchange of working substance with the first pressure vessel 11. In this way, the temperature and the pressure of the working substance in the first pressure vessel 11 may be increased finally. Similarly, after passing by the heat source 20, the second heating branch 104 finishes the exchange of working substance with the second pressure vessel 12, to make the temperature and the pressure of the working substance in the second pressure vessel 12 increased.

During the normal operation of the supercritical fluid power system, the first heating branch 103 and the second heating branch 104 may not be connected at the same time. A control valve may be disposed in the first and second heating branches respectively, and configured to control the corresponding heating branch to be connected when the corresponding heating branch needs thermal energy and to be disconnected when the corresponding heating branch does not need thermal energy.

Referring to FIG. 1, the control valve in the first heating branch 103 is a third control valve V3, and the control valve in the second heating branch 104 is a fourth control valve V4. When the third control valve V3 is opened, the first heating branch 103 is connected; and when the fourth control valve V4 is opened, the second heating branch 104 is connected. As the heat source 20 serves the first pressure vessel 11 and the second pressure vessel 12 alternately, the third control valve V3 and the fourth control valve V4 are not connected at the same time. That is, when one of the third and fourth control valves is opened, the other one should be closed.

In some embodiments, the third control valve V3 and the fourth control valve V4 may be any valve which is capable of controlling the connectivity of a channel. The number of the third control valve V3 or the fourth control valve V4 may be one or more. In the embodiment, there are two third control valves V3 and two fourth control valves V4. The two third control valves V3 are disposed on a first portion of the first heating branch 103 whose direction is from the first pressure vessel 11 to the heat source 20, and on a second portion of the first heating branch 103 whose direction is from the heat source 20 to the first pressure vessel 11, respectively. The two fourth control valves V4 are disposed on a first portion of the second heating branch 104 whose direction is from the second pressure vessel 12 to the heat source 20, and on a second portion of the second heating branch 104 whose direction is from the heat source 20 to the second pressure vessel 12, respectively.

In some embodiments, a transport pump may be disposed in the first and second heating branches respectively, operates when the corresponding heating branch needs thermal energy, and stops operation when the corresponding heating branch does not need thermal energy.

Referring to FIG. 1, the transport pump in the first heating branch 103 is a first transport pump P1, and the transport pump in the second heating branch 104 is a second transport pump P2. The first transport pump P1 and the second transport pump P2 may speed the flow of the working substance in the corresponding heating branch to speed the increment of the temperature and pressure of the working substance in the corresponding pressure vessel.

As the first heating branch 103 and the second heating branch 104 are not connected at the same time when the supercritical fluid power system operates normally, the first transport pump P1 and the second transport pump P2 do not work at the same time.

In some embodiments, the first transport pump P1 and the second transport pump P2 may be any existing transport pump.

As described above, the first pressure vessel 11 and the second pressure vessel 12 may use the cold source 30 in common. Referring to FIG. 1, the power cycle loop 10 includes a first cooling branch 105 and a second cooling branch 106, wherein two ends of the first cooling branch 105 are connected with the first pressure vessel 11 respectively, two ends of the second cooling branch 106 are connected with the second pressure vessel 12 respectively, and the first and second cooling branches pass by the cold source 30 respectively.

In some embodiments, the working substance may also be filled into the first cooling branch 105 and the second cooling branch 106, where the working substance in the first cooling branch 105 can be exchanged with the working substance in the first pressure vessel 11, and the working substance in the second cooling branch 106 can be exchanged with the working substance in the second pressure vessel 12. When the first cooling branch 105 passes by the cold source 30, the temperature and the pressure of the working substance in the first cooling branch 105 may be reduced, and the working substance may flow between the first cooling branch 105 and the first pressure vessel 11 which has a relatively high pressure to realize the exchange of working substance with the first pressure vessel 11. In this way, the temperature and the pressure of the working substance in the first pressure vessel 11 may be reduced finally. Similarly, after passing by the cold source 30, the second cooling branch 106 finishes the exchange of working substance with the second pressure vessel 12, to make the temperature and the pressure of the working substance in the second pressure vessel 12 decreased.

During the normal operation of the supercritical fluid power system, the first cooling branch 105 and the second cooling branch 106 may not be connected at the same time. A control valve may be disposed in the first and second cooling branches respectively, and configured to control the corresponding cooling branch to be connected when the corresponding cooling branch needs cooling and to be disconnected when the corresponding cooling branch does not need cooling.

Referring to FIG. 1, the control valve in the first cooling branch 105 is a fifth control valve V5, and the control valve in the second cooling branch 106 is a sixth control valve V6. When the fifth control valve V5 is opened, the first cooling branch 105 is connected; and when the sixth control valve V6 is opened, the second cooling branch 106 is connected. As the cold source 30 serves the first pressure vessel 11 and the second pressure vessel 12 alternately, the fifth control valve V5 and the sixth control valve V6 are not connected at the same time. That is, when one of the fifth and sixth control valves is opened, the other one should be closed.

In some embodiments, the fifth control valve V5 and the sixth control valve V6 may be any valve which is capable of controlling the connectivity of a channel. The number of the fifth control valve V5 or the sixth control valve V6 may be one or more. In the embodiment, there are two fifth control valves V5 and two sixth control valves V6. The two fifth control valves V5 are disposed on a first portion of the first cooling branch 105 whose direction is from the first pressure vessel 11 to the cold source 30, and on a second portion of the first cooling branch 105 whose direction is from the cold source 30 to the first pressure vessel 11, respectively. The two sixth control valves V6 are disposed on a first portion of the second cooling branch 106 whose direction is from the second pressure vessel 12 to the cold source 30, and on a second portion of the second cooling branch 106 whose direction is from the cold source 30 to the second pressure vessel 12, respectively.

In some embodiments, the first to the sixth control valves may be electromagnetic valves or pneumatic valves. If the control valves are pneumatic valves, the control valves should be provided with a device which is capable of generating gas with a high pressure, to drive the opening and closing of the control valves. Power required by the electromagnetic valves and the device generating the gas with the high pressure may be provided by the generator which serves as the driven portion 13.

In some embodiments, a transport pump may be disposed in the first and second cooling branches respectively, operates when the corresponding cooling branch needs cooling, and stops operation when the corresponding cooling branch does not need cooling.

Referring to FIG. 1, the transport pump in the first cooling branch 105 is a third transport pump P3, and the transport pump in the second cooling branch 106 is a fourth transport pump P4. The third transport pump P3 and the fourth transport pump P4 may speed the flow of the working substance in the corresponding cooling branch to speed the drop of the temperature and pressure of the working substance in the corresponding pressure vessel.

As the first cooling branch 105 and the second cooling branch 106 are not connected at the same time when the supercritical fluid power system operates normally, the third transport pump P3 and the fourth transport pump P4 do not work at the same time.

In some embodiments, the third transport pump P3 and the fourth transport pump P4 may be any existing transport pump.

In some embodiments, each of the first pressure vessel 11 and the second pressure vessel 12 may be provided with the heat source 20 and the cold source 30. In some embodiments, the heat source 20 and the cold source 30 may be equipped inside or outside of the corresponding pressure vessel, and should meet requirements on the increment or decrease of temperature and pressure of the working substance therein.

Categories and structures of the heat source 20 and the cold source 30 are described below.

In some embodiments, the heat source 20 may be a natural substance with thermal energy existing in the nature, which is defined as a first natural substance hereinafter. In some embodiments, the heat source 20 may include a mechanical device capable of converting low-grade thermal energy into high-grade thermal energy, such as a heat pump. In some embodiments, the heat source 20 may be a matter capable of generating thermal energy via an oxidation reaction. In some embodiments, the heat source 20 may be an obtainable liquid or gas containing exhausted heat, such as an exhausted liquid or gas produced in industrial manufacturing or daily life.

In some embodiments, the cold source 30 may be a natural substance with a relatively low temperature existing in the nature, which is defined as a second natural substance hereinafter. In some embodiments, the cold source 30 may include a mechanical device having a refrigeration function, such as a refrigerator group. In some embodiments, the cold source 30 may be an obtainable liquid or gas with a relatively low temperature, such as an exhausted liquid or gas produced in industrial manufacturing or daily life.

In some embodiments, the heat source 20 includes a heat pump, and the cold source 30 includes a refrigerator group, to improve heating efficiency of the heat source 20 and cooling efficiency of the cold source 30.

In some embodiments, the heat source 20 may include: a first fluid 20a which is not communicated with the working substance; a first heat exchanger 21 including a first chamber and a second chamber which are separated from each other (not shown in Figures), wherein the first chamber is connected with the power cycle loop 10 for the working substance to flow; and a heat pump 22, wherein an output end of the heat pump 22 is connected with the second chamber, and the heat pump 22 is configured to extract thermal energy of the first fluid 20a and transport the extracted thermal energy to the second chamber, so as to perform heat exchange with the working substance. As thermal energy is extracted, a temperature of the first fluid 20a decreases, and the first fluid 20a flows from the heat pump 22, as shown with reference 20a' in FIG. 1.

In some embodiments, the heat pump 22 may be any heat pump formed by exiting techniques or new techniques in the future.

In some embodiments, the first heat exchanger 21 may be any kind of heat exchanger, for example, including a heat pipe, a tubular heat exchanger or a plate heat exchanger.

In some embodiments, the first heat exchanger 21 may be an independent heat exchanger, or also serve as a condenser of the heat pump 22. The heat pump 22 extracts thermal energy from the first fluid 20a and transfers it to the condenser (i.e., the first heat exchanger 21). The extracted thermal energy and the working substance exchange heat in the first heat exchanger 21 to increase the pressure of the working substance. It should be noted that, during the normal operation of the supercritical fluid power system, the temperature of the working substance in the first heat exchanger 21 is higher than its critical temperature, to ensure the working substance to be in the supercritical fluid state all the time.

In some embodiments, the first fluid 20a may be a fluid in natural environment, such as fresh water (for example, river, lake or rivulet), ocean or air. In some embodiments, the first fluid 20a may be an obtainable liquid or gas containing exhausted heat, such as an exhausted liquid or gas produced in industrial manufacturing or daily life.

When the first fluid 20a is a liquid, an evaporator of the heat pump 22 may be a plate heat exchanger preferably. The evaporator may be any other heat exchanger, such as a heat pipe or a tubular heat exchanger. Referring to FIG. 1, when the first fluid 20a is a liquid, a transport pump 23 may be disposed at an input end of the heat pump 22, to speed the flow of the first fluid 20a towards the heat pump 22.

When the first fluid 20a is air or other gases, an evaporator of the heat pump 22 may be a finned heat exchanger preferably. The evaporator may be any other heat exchanger, such as a heat pipe or a tubular heat exchanger. When the first fluid 20a is a gas, a fan (such as a turbine or a blower, not shown in Figures) may be disposed at an input end of the heat pump 22, to speed the flow of the first fluid 20a towards the heat pump 22.

In some embodiments, the cold source 30 may include: a second fluid 30a which is not communicated with the working substance; a second heat exchanger 31 including a third chamber and a fourth chamber which are separated from each other (not shown in Figures), wherein the third chamber is connected with the power cycle loop 10 for the working substance to flow; and a refrigerator group 32, wherein an output end of the refrigerator group 32 is connected with the fourth chamber, and the refrigerator group 32 is configured to extract thermal energy of the working fluid which is emitted into the second heat exchanger 31 to cool the working substance and release the extracted thermal energy to the second fluid 30a which then takes away the thermal energy. By absorbing the thermal energy, a temperature of the second fluid 30a is increased, and the second fluid 30a flows from the refrigerator group 32, as shown with reference 30a' in FIG. 1.

In some embodiments, the refrigerator group 32 may be any refrigerator group formed by exiting techniques or new techniques in the future.

In some embodiments, the second heat exchanger 31 may be any kind of heat exchanger, for example, including a heat pipe, a tubular heat exchanger or a plate heat exchanger.

In some embodiments, the second heat exchanger 31 may be an independent heat exchanger, or also serve as an evaporator of the refrigerator group 32. The refrigerator group 32 releases the extracted thermal energy to the second fluid 30a and then liquefied refrigerant evaporates in the second heat exchanger 31 to realize cooling. The liquefied refrigerant and the working substance exchange heat in the second heat exchanger 31 to reduce the pressure of the working substance. It should be noted that, during the normal operation of the supercritical fluid power system, the temperature of the working substance in the second heat exchanger 31 is higher than or equal to its critical temperature, to ensure the working substance to be in the supercritical fluid state all the time.

In some embodiments, the second fluid 30a may be a fluid in natural environment, such as fresh water (for example, river, lake or rivulet), ocean or air. In some embodiments, the second fluid 30a may be an obtainable liquid or gas containing exhausted heat, such as an exhausted liquid or gas produced in industrial manufacturing or daily life.

When the second fluid 30a is air or other gases, a condenser of the refrigerator group 32 may be a finned heat exchanger with a fan preferably. When the second fluid 30a is a liquid, the condenser of the refrigerator group 32 may be a plate heat exchanger preferably.

Referring to FIG. 1, the cold source 30 may further include a spraying device 33 for cooling the condenser of the refrigerator group 32, to reduce power required by the operation of the refrigerator group 32.

Figure 3:
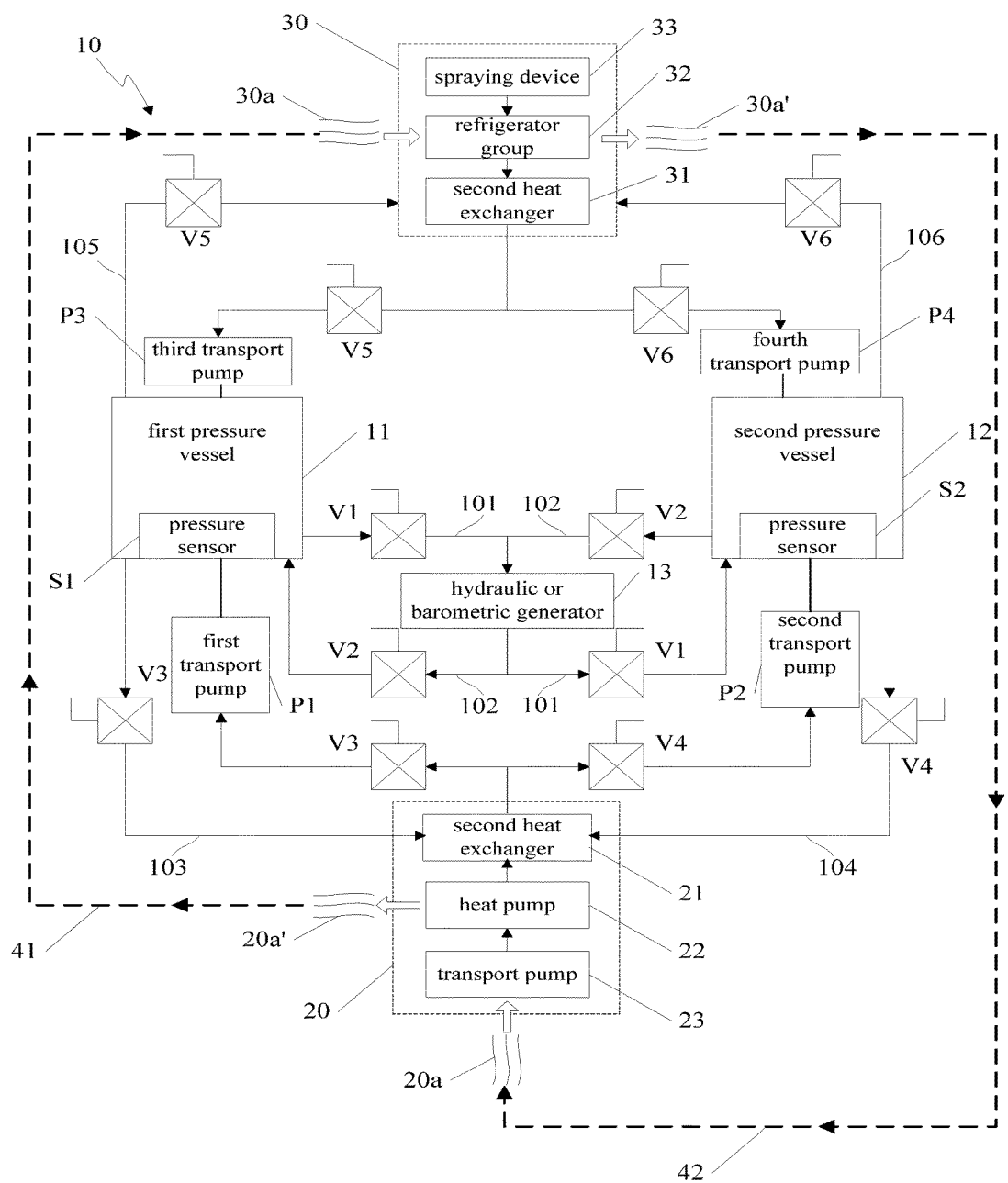
FIG. 3 schematically illustrates a structural diagram of a supercritical fluid power system according to an embodiment.

The temperature of the first fluid 20a decreases after it flows out of the heat pump 22, and the temperature of the second fluid 30a required by the cold source 30 is as low as possible. Besides, when flowing out of the refrigerator group 32, the second fluid 30a's temperature is increased, while the temperature of the first fluid 20a required by the heat source 20 is as high as possible. Therefore, referring to FIG. 3, following configurations may be made.

A first channel 41 for flowing of the first fluid 20a is provided between the heat source 20 and the cold source 30, wherein the first fluid 20*a* flowing out of the heat source 20 through the first channel 41 serves as the second fluid 30*a* to flow into the cold source 30. In some embodiments, the first fluid 20*a* flowing out of the heat pump 22 may serve as the second fluid 30*a* or supplement of the second fluid 30*a*. Besides, a second channel 42 for flowing of the second fluid 30*a* is provided between the heat source 20 and the cold source 30, wherein the second fluid 30*a* flowing out of the cold source 30 through the second channel 42 serves as supplement of the first fluid 20*a* to flow into the heat source 20. In this way, work load of the heat pump and the refrigerator group 32 may be reduced and an EER of the supercritical fluid power system may be improved.

From above, by utilizing a natural law that pressures of a supercritical fluid working substance greatly vary with temperatures, heat exchange is performed between the supercritical fluid working substance and the first fluid 20*a* (such as air at room temperature, or a liquid, for example, a river or a lake) by the heat source 20 to increase the pressure in the first pressure vessel 11. Afterwards, the cold source 30 is configured to reduce the temperature of the second pressure vessel 12 which is connected with the first pressure vessel 11, so that a pressure difference is formed between the first and second pressure vessels. The pressure difference provides power to the driven portion 13 between the first and second pressure vessels to make the power generation device generate power, which realizes the power generation process. Besides, the heat source 20 and the cold source 30 alternately serve the two pressure vessels to realize recycle of power generation.

Further, the heat pump and the refrigerator group are configured to heat and cool the two pressure vessels respectively to form the pressure difference. Compared with an existing mode of using saturated vapor pressure theory (i.e., repeated gasification and liquidation) to form a pressure difference, the above way enables a higher EER, saves much power consumption, and forms a higher pressure difference to provide power to the driven portion 13.

Some explanations are made below.

First, as the first fluid 20*a* and the second fluid 30*a* are mainly air or water from a river, a lack or an ocean, the working substance may be a substance which can be in the supercritical fluid stat at the room temperature. Scientifically speaking, the substance which can be in the supercritical fluid stat at the room temperature hardly has the potential of vaporization and liquidation, so that power consumption in endless vaporization and liquidation may be avoided.

Second, as the working substance is the substance which can be in the supercritical fluid stat at the room temperature and power consumption in endless vaporization and liquidation is avoided, the heat pump and the refrigerator group which is negligible to vaporization and liquidation may be used. The heat pump 22 is provided in the heat source 20, and the refrigerator group 32 is provided in the cold source 30, the temperature difference and the pressure difference between the first pressure vessel 11 and the second pressure vessel 12 may be increased, so that larger power can be provided to the driven portion 13. When the driven portion 13 is a power generation device, its power generation ability may be greatly improved and cost may be relatively low, which enables full-time power generation.

Third, at current technology level, an EER of the heat pump can be up to about 9.0. By employing the high EER of the heat pump, the temperature and the pressure of the working substance is increased to form a high-pressure area in the pressure vessel. Compared with the existing mode of using saturated vapor pressure theory (i.e., repeated gasification and liquidation) to form a pressure difference, the above way enables much power consumption to be saved.

In some embodiments, a pressure sensor may be disposed in each of the first and second pressure vessels for detecting an inner pressure in the corresponding pressure vessel and outputting a signal of the detected inner pressure. Referring to FIG. 1, a reference S1 denotes to the pressure sensor in the first pressure vessel 11 which is defines as a first pressure sensor, and a reference S2 denotes to the pressure sensor in the second pressure vessel 12 which is defines as a second pressure sensor.

The first pressure sensor S1 and the second pressure sensor S2 may be any kind of existing pressure sensors.

Figure 2:
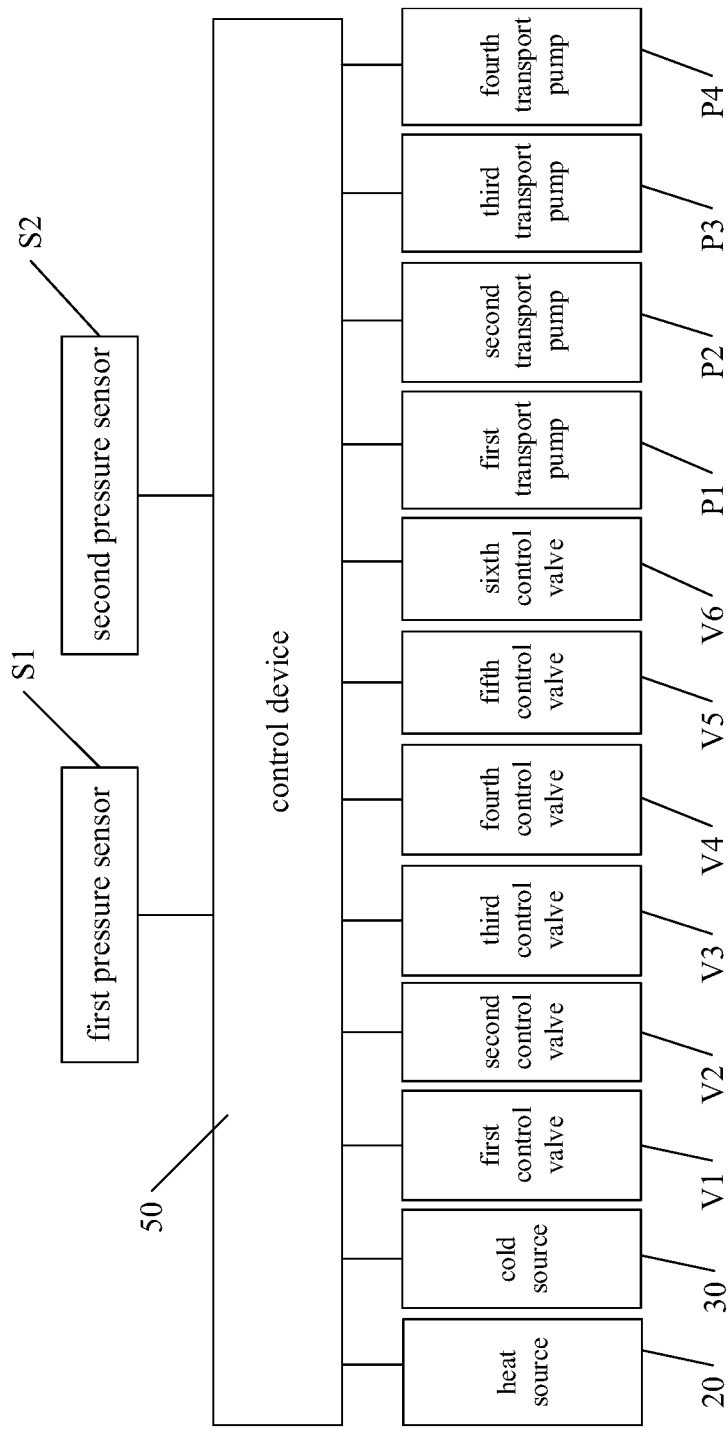
FIG. 2 schematically illustrates a structural diagram of a control device and electrical devices according to an embodiment.

Referring to FIG. 2, in some embodiments, the supercritical fluid power system may further include a control device 50 configured to receive the signal of the detected inner pressure output by the first pressure sensor S1 and the second pressure sensor S2, and send a first instruction or a second instruction based on the signal of the detected inner pressure to control the operation of the heat source 20, the cold source 30 and the power cycle loop 10.

The first instruction may control the heat source 20 to provide thermal energy to the working substance in the first pressure vessel 11 and the cold source 30 to cool the working substance in the second pressure vessel 12. In some embodiments, the first instruction may only control the heat source 20 to provide thermal energy to the working substance in the first pressure vessel 11. In some embodiments, the first instruction may only control the cold source 30 to cool the working substance in the second pressure vessel 12. In some embodiments, the first instruction may both control the heat source 20 to provide thermal energy to the working substance in the first pressure vessel 11, and also control the cold source 30 to cool the working substance in the second pressure vessel 12.

The second instruction controls the heat source 20 to provide thermal energy to the working substance in the second pressure vessel 12 and the cold source 30 to cool the working substance in the first pressure vessel 11. In some embodiments, the second instruction may only control the heat source 20 to provide thermal energy to the working substance in the second pressure vessel 12. In some embodiments, the second instruction may only control the cold source 30 to cool the working substance in the first pressure vessel 11. In some embodiments, the second instruction may both control the heat source 20 to provide thermal energy to the working substance in the second pressure vessel 12, and also control the cold source 30 to cool the working substance in the first pressure vessel 11.

Electrical devices including the control valves and the transport pumps in the power cycle loop 10 and electrical devices in the heat source 20 and the cold source 30 are coupled with the control device 50 in a wired or wireless manner, and configured to receive instructions sent by the control device 50 and operate according to the received instructions.

In some embodiments, when the control device 50 sends the first instruction, the heat source 20 and the cold source 30 operate at the same time. In this situation, in the power cycle loop 10, the first unidirectional branch 101, the first heating branch 103 and the second cooling branch 106 are connected respectively (the first unidirectional branch 101 may be connected if other conditions are met, such as the pressure difference should reach a predetermined value), and the second unidirectional branch 102, the second heating branch 104 and the first cooling branch 105 are disconnected. That is, the first control valve V1, the third control valve V3 and the sixth control valve V6 are opened, and the second control valve V2, the fourth control valve V4 and the fifth control valve V5 are closed. The temperature and the pressure of the working substance in the first pressure vessel 11 are increased under the effect of the heat source 20, and the temperature and the pressure of the working substance in the second pressure vessel 12 are reduced under the effect of the cold source 30. In this way, the working substance may flow from the first pressure vessel 11 to the second pressure vessel 12 through the first unidirectional branch 101, to provide power to the driven portion 13.

In some embodiments, when the control device 50 sends the second instruction, the heat source 20 and the cold source 30 operate at the same time. In this situation, in the power cycle loop 10, the first unidirectional branch 101, the first heating branch 103 and the second cooling branch 106 are disconnected, and the second unidirectional branch 102, the second heating branch 104 and the first cooling branch 105 are connected respectively (the second unidirectional branch 102 may be connected if other conditions are met, such as the pressure difference should reach a predetermined value). That is, the first control valve V1, the third control valve V3 and the sixth control valve V6 are closed, and the second control valve V2, the fourth control valve V4 and the fifth control valve V5 are opened. The temperature and the pressure of the working substance in the second pressure vessel 12 are increased under the effect of the heat source 20, and the temperature and the pressure of the working substance in the first pressure vessel 11 are reduced under the effect of the cold source 30. In this way, the working substance may flow from the second pressure vessel 12 to the first pressure vessel 11 through the second unidirectional branch 102, to provide power to the driven portion 13.

In some embodiments, the hydraulic generator or the barometric generator which serves as the driven portion 13 may be electrically coupled with the heat pump 22, the refrigerator group 32, the first heat exchanger 21, the second heat exchanger 31, the first to fourth transport pumps, the first to sixth control valves, the control device 50 and other electrical devices, to provide power to these electrical devices.

The hydraulic generator or the barometric generator which serves as the driven portion 13 may be any kind of existing power generator, such as an alternating-current generator or a direct-current generator.

Based on the above structures, working principles of the system are described below by taking one operation mode as an example.

The Initialization Stage

The power cycle loop 10 is evacuated before the system is started, and then filled with the working substance. The working substance is filled into each unidirectional branch, each heating branch, each cooling branch, the first pressure vessel 11 and the second pressure vessel 12. During the filling process, the working substance may be in a gas-liquid mixing state below the critical temperature or in a supercritical fluid state. Afterwards, the control device 50 controls electrical devices in the heat source 20, the control valves and the transport pumps in the first heating branch 103 and the second heating branch 104 to be opened, and controls electrical devices in the cold source 30, the control valves and the transport pumps in the first cooling branch 105 and the second cooling branch 106 to be closed.

Afterwards, with temporary activation of an external power supply, the first heat exchanger 21, the heat pump 22, the transport pump 23, the first transport pump P1 and the second transport pump P2 start to operate. The working substance in a cavity connected between the first heat exchanger 21 and the power cycle loop 10 exchanges heat energy with the first fluid 20a through the heat pump 22 and the transport pump 23, so that the temperature and the pressure of the working substance in the cavity increase (if the initial state of the working substance is the gas-liquid mixing state, the working substance is continuously heated to be in the supercritical fluid state when its temperature is above the critical temperature, and then its temperature and pressure start to increase)

Under the effect of the first transport pump P1 and the second transport pump P2, the working substance with the increased temperature and pressure are transported to the first pressure vessel 11 and the second pressure vessel 12 through the first heating branch 103 and the second heating branch 104. Afterwards, some working substance in the first pressure vessel 11 and the second pressure vessel 12 may flow back to the first heat exchanger 21 through the first heating branch 103 and the second heating branch 104, until all the working substance is in the supercritical fluid state.

When the pressure in the first pressure vessel 11 and the second pressure vessel 12 does not increase any more or exceeds a predetermined pressure, or a pressure rise rate is smaller than a predetermined rate, the control device 50 controls the heat source 20, the first heating branch 103 and the second heating branch 104 to be disconnected. Afterwards, the control device 50 controls the control valves in the second heat exchanger 31, the refrigerator group 32, the spraying device 33 and the second cooling branch 106, and the fourth transport pump P4 to be opened. The working substance in a cavity connected between the second heat exchanger 31 and the power cycle loop 10 exchanges heat energy with the second fluid 30a outside through the second heat exchanger 31 and the refrigerator group 32 to be cooled and have its pressure reduced. Under the effect of the fourth transport pump P4, the working substance in the cavity is transported to the second pressure vessel 12 through the second cooling branch 106. Afterwards, under the effect of the fourth transport pump P4, some working substance in the second pressure vessel 12 may flow back to the second heat exchanger 31 through the second cooling branch 106, until the pressure does not decrease or is lower than a predetermined pressure, or a pressure decreasing rate is smaller than a predetermined rate.

The control device 50 controls the cold source 30 to be closed, and controls the control valves and the transport pumps in the second cooling branch 106 to be closed. So far, the whole system finishes preparation in the initialization stage. The working substance stored in the first pressure vessel 11 and the second pressure vessel 12 has a pressure difference which provides the basis of operation of the driven portion 13.

Periodic Cycle During the Normal Operation

The control device 50 controls the heat source 20 and the cold source 30 to be started, the first unidirectional branch 101, the first heating branch 103 and the second cooling branch 106 to be connected, and transport pumps in each connected branch to operate.

As a temperature difference between the first pressure vessel 11 and the second pressure vessel 12 causes a pressure difference, the working substance in the first pressure vessel 11 starts to flow to the driven portion 13 through the first unidirectional branch 101 and works there to generate power. Afterwards, the working substance flows to the second pressure vessel 12.

For the driven portion 13, instability of voltage or current caused by the gradual decrease of the pressure difference between the first pressure vessel 11 and the second pressure vessel 12 may be solved by using a generator having voltage or current stabilizing function or providing a voltage stabilizer or a current stabilizer outside of the system.

When the pressure difference between the first pressure vessel 11 and the second pressure vessel 12 is smaller than a predetermined pressure difference (almost reaching balance), the control device 50 switches the opening and closing states of each component. The control device 50 controls the first unidirectional branch 101, the first heating branch 103 and the second cooling branch 106 to be disconnected, the transport pumps in the disconnected branches to stop operation, the second heating branch 104 and the first cooling branch 105 to be connected, and the transport pumps in the connected branches to operate.

In this way, the heat energy from the heat source 20 input through the first heat exchanger 21 starts to heat the working substance in the second pressure vessel 12 to increase the pressure thereof, and the cold source 30 starts to cool the working substance in the first pressure vessel 11 through the second heat exchanger 31 to reduce the pressure thereof. During this process, the driven portion 13 may stop operation temporarily, and power of the whole system may be provided externally (alternatively, a storage battery may be provided in the system to provide the power).

When the pressure difference between the first pressure vessel 11 and the second pressure vessel 12 is greater than the predetermined pressure difference, the control device 50 controls the second unidirectional branch 102 to be connected, the working substance with higher pressure in the second pressure vessel 12 flows into the driven portion 13 through the second unidirectional branch 102 and works there. Afterwards, the working substance flows to the first pressure vessel 11.

For the driven portion 13, instability of voltage or current caused by the gradual decrease of the pressure difference between the first pressure vessel 11 and the second pressure vessel 12 may be solved by using a generator having voltage or current stabilizing function or providing a voltage stabilizer or a current stabilizer outside of the system.

When the pressure difference between the first pressure vessel 11 and the second pressure vessel 12 is smaller than the predetermined pressure difference (almost reaching balance), the control device 50 switches the opening and closing states of each component. The control device 50 controls the second unidirectional branch 102, the second heating branch 104 and the first cooling branch 105 to be disconnected, the transport pumps in the disconnected branches to stop operation, the first heating branch 103 and the second cooling branch 106 to be connected, and the transport pumps in the connected branches to operate.

In this way, the heat energy from the heat source 20 input through the first heat exchanger 21 starts to heat the working substance in the first pressure vessel 11 to increase the pressure thereof, and the cold source 30 starts to cool the working substance in the second pressure vessel 12 through the second heat exchanger 31 to reduce the pressure thereof. During this process, the driven portion 13 may stop operation temporarily, and power of the whole system may be provided externally (alternatively, a storage battery may be provided in the system to provide the power). When the pressure of the working substance in the first pressure vessel 11 does not increase and the pressure of the working substance in the second pressure vessel 12 does not decrease any more, one cycle is ended, and the system goes to the next cycle. In this way, the system operates normally.

Technical effects of embodiments of the present disclosure are described below.

As supercritical technology belongs to new technical field, it hardly obtains a table about density, temperature and pressure of substances having a critical temperature between −270° C. and 100° C. in a supercritical fluid state by common search. It is possible to deduce a general range by querying a saturated temperature and pressure table of the substances. Take carbon dioxide ($CO_2$) as an example. Based on the saturated temperature and pressure table of carbon dioxide, the critical temperature of the carbon dioxide is 31° C., and the corresponding saturated vapor pressure has a difference of 0.165 MPa (A) with that corresponding to the temperature of 30° C. Therefore, it is deduced that as long as the density of the supercritical fluid of carbon dioxide is greater than its density of the saturated vapor at 31° C., at least a pressure difference of 0.165 MPa (A) may be generated once the temperature is increased by 1° C.

In embodiments of the present disclosure, under the effect of the heat pump 22 and the refrigerator group 32, even if a temperature difference may not be formed between the first fluid 20a and the second fluid 30a, a temperature difference of at least 10° C. can be generated between the first pressure vessel 11 and the second pressure vessel 12 (it is obtained according to refrigeration parameters provided by Bitzer Refrigeration Technology China Co., Ltd.). Thus, the system may generate a pressure difference of at least 1.65 MPa (A) to be used for power generation, which makes the system possess practicability. In the above situation, the density of carbon dioxide is equal to its density corresponding to the saturated vapor pressure at 31° C. In fact, the system may employ the supercritical fluid of carbon dioxide with a higher density (no upper limit theoretically). Accordingly, the pressure difference caused by temperature change of each centigrade may be greater, which provides much feasibility for generating more power by using minimum temperature difference.

It should be noted that, carbon dioxide ($CO_2$) is taken as an example in the above description. Similarly, the above idea is also adapted for other substances having a critical temperature between −270° C. and 100° C. as described above. There are a great number of substances having a critical temperature between −270° C. and 100° C. and it is impossible to list all these substances. Besides, new substances will be created continuously in future. In some embodiments, the substances having a critical temperature between −270° C. and 100° C. may at least include refrigerants with a critical temperature below 100° C., such as hydrogen, nitrogen, oxygen, ozone, carbon dioxide, carbon monoxide, nitrogen dioxide, hydrogen chloride, hydrogen sulfide, bromine, ammonia, methane, ethane, ethylene, acetylene, chlorine, helium, neon, argon, krypton, xenon, radon, deuterium, nitric oxide, nitrous oxide, fluorine, boron fluoride, diborane or air. The working substance may be one of the above substances, or any combinations of the above substances. In practice, the working substance may be selected according to practical situations based on a basic rule. The basic rule includes that: the selected substance should be in the supercritical fluid when operates in the power cycle loop; and the pressure difference of the selected substance corresponding to a temperature difference is greatest among all the substances.

Figure 5:
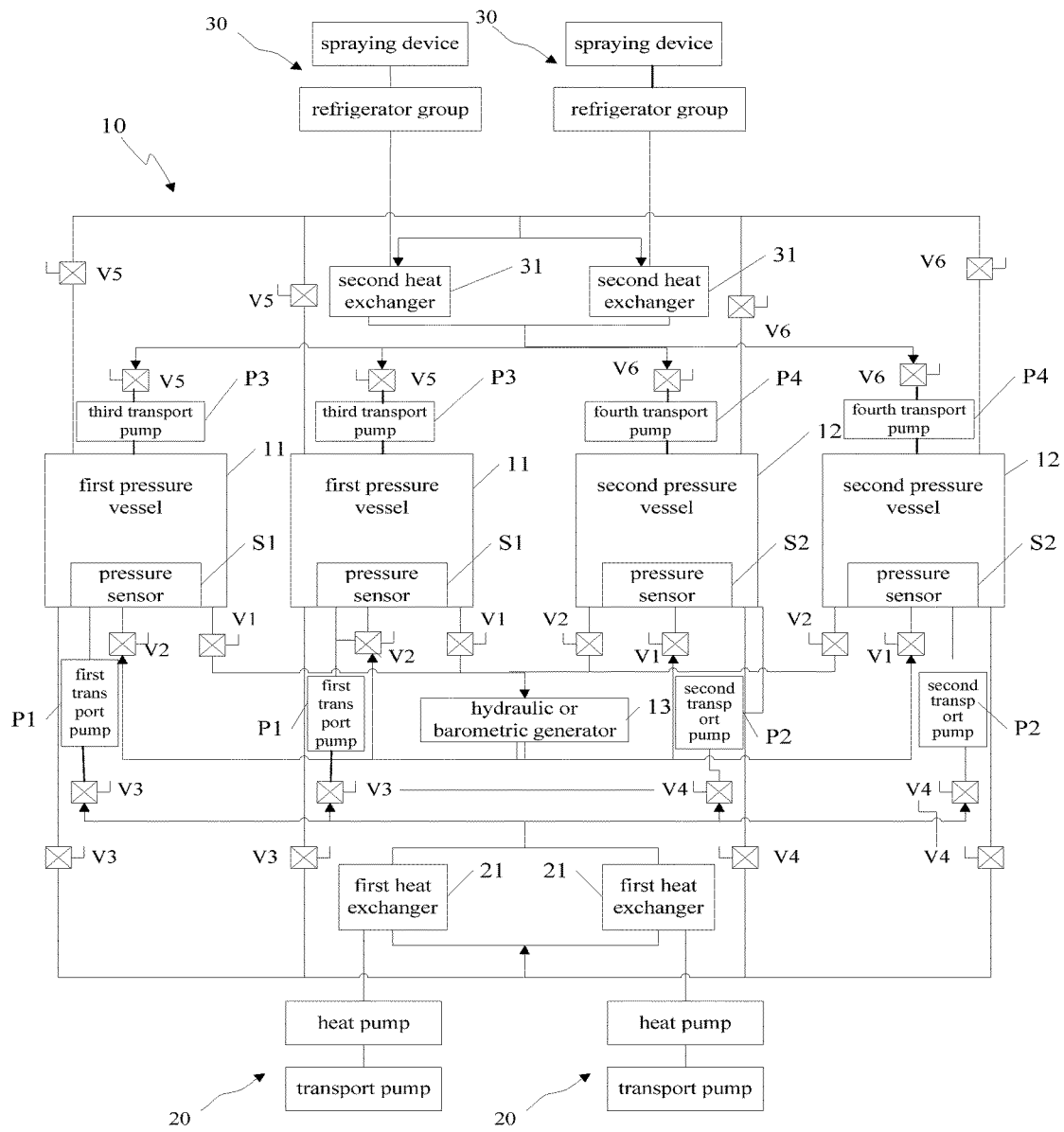
FIG. 5 schematically illustrates a structural diagram of a supercritical fluid power system according to an embodiment.

Other embodiments are possible. Referring to FIG. 5 (the first fluid 20a and the second fluid 30a are not shown in FIG. 5), in some embodiments, the system may include a plurality of first pressure vessels 11 and a plurality of second pressure vessels 12. Each of the plurality of first pressure vessels 11 corresponds to one of the plurality of second pressure vessels 12 to form a plurality of pressure vessel groups each of which includes one first pressure vessel 11 and one second pressure vessel 12, and the heat source 20 and the cold source 30 serve for at least one pressure vessel group in a same time period. Configuration of branches between the pressure vessels in each pressure vessel group and control valves in each pressure vessel group may be similar to the above embodiments. Besides, a first channel 41 and a second channel 42 may be disposed between the heat source 20 and the cold source 30 for the first fluid and the second fluid to flow and exchange.

Still referring to FIG. 5, the system includes two first pressure vessels 11 and two second pressure vessels 12 which constitute two pressure vessel groups. Each pressure vessel group is provided with a group of heat source 20 and cold source 30. When one group of heat source 20 and cold source 30 works, the other group of heat source 20 and cold source 30 may halt to have a break, which may prolong the service life of equipment in the heat source 20 and the cold source 30, facilitate the maintenance and repair of the equipment, and ensure the continuous operation of the whole power cycle loop 10. Besides, switch of the control valves may shock stable operation of a hydraulic generator or a barometric generator. By employing the plurality group of pressure vessels, the frequency of switch of the control valves in each group may be reduced, and this reduces the shock to the hydraulic generator or the barometric generator.

When the number of the pressure vessel groups is greater than two, the heat source 20 and the cold source 30 serve for different pressure vessel groups in a same time period. For example, different pressure vessel groups may operate alternately to improve efficiency. Besides, if conditions of site and equipment are allowed, all the pressure vessel groups may use the heat source 20 and the cold source 30 in common, or several pressure vessel groups use the heat source 20 and the cold source 30 in common.

The supercritical fluid power system provided in embodiments of the present disclosure may be applied in various environment. In particular environment having a natural temperature difference, at least one of the heat source and the cold source may be a natural substance in the natural environment. Some embodiments are provided below.

In the first embodiment, the system may be applied in indoor or outdoor environment having a temperature difference. For example, in summer, the outdoor temperature is relatively high, while the indoor temperature is generally lower than the outdoor temperature due to refrigeration of an air conditioner. Thus, the indoor air can serve as the cold source and the outdoor air can serve as the heat source. In winter, the outdoor temperature is relatively low, while the indoor temperature is generally higher than the outdoor temperature due to heating. Thus, the indoor air can serve as the heat source and the outdoor air can serve as the cold source.

In the second embodiment, the system may be applied in desert environment. In the desert environment, in the day, the temperature of air is obviously higher than the temperature of underground having a particular depth. Thus, the air can serve as the heat source and the underground can serve as the cold source. In the night, the temperature of air is obviously lower than the temperature of the underground. Thus, the air can serve as the cold source and the underground can serve as the heat source.

In the third embodiment, the system may be applied in a polar region. In the polar region, such as the Antarctic Pole or the Arctic Pole, the temperature of above-ice environment is a relatively low value below 0° C., while the temperature of water under the ice is no less than 0° C. Thus, the air in the above-ice environment can serve as the cold source and the water under the ice can serve as the heat source.

In the above embodiments, a heat pump and a refrigerator group may be further disposed in the heat source or the cold source, to improve operation efficiency of the system.

It should be noted that, the system is also adapted for environment with no temperature difference. For example, when the temperatures of the first fluid and the second fluid are the same, a temperature difference may be generated by operation of the heat pump and the refrigerator group. Besides, EER principle of the heat pump and the refrigerator group enables the system to generate surplus power which can be output externally. The above result is obtained according to refrigeration parameters provided by Bitzer Refrigeration Technology China Co., Ltd. Due to the importance of power generator, the system may employ other products with a higher EER to generate more power output.

From above, in embodiments of the present disclosure, the fact that the working substance in the supercritical fluid state with a low boiling point is sensitive to the room temperature is utilized. Further, the heat pump and the refrigerator group are used to make or enlarge the temperature difference, to generate enough pressure difference for power generation. Energy can be extracted from air, lakes and rivers effectively, so that all-weather power generation may be realized. If the first fluid and the second fluid have temperature difference, efficiency of power generation of the system may be higher. The greater the temperature difference is, the better the power generation is.

For example, in frosty environment, such as Chinese Taipei in winter, Siberia or the Arctic Ocean, an ice layer on a surface of a river, a lake or an ocean is relatively thick. The temperature of above-ice environment is dozens of degree below 0° C., while the temperature of water under the ice layer is about 0° C. or higher than 0° C. A great temperature difference is formed between the water under the ice layer and air above the ice layer. Under this situation, the system may provide enough power required by industrial manufacturing or daily life.

For another example, in a desert, a temperature in the air may be above 40° C., while a temperature of water under the ground may be much lower than 40° C. The air and the water under the ground may be used for power generation.

For another example, a temperature difference may exist between an ocean and the air above the ocean. The system making use of the temperature difference may be applied to provide power for sailing of ships, to realize zero pollution and zero emission.

In an embodiment, a method for controlling any one of the above supercritical fluid power systems is provided, including:

at an initial time period, controlling the heat source 20 to provide thermal energy to the working substance in the first pressure vessel 11 and the second pressure vessel 12, so as to convert the working substance in the power cycle loop 10 into a supercritical fluid (this stage is the above-mentioned initialization stage of the system), where at the initial time period, the first pressure vessel 11 and the second pressure vessel 12 are filled with the working substance which may be in a gas-liquid mixing state below the critical temperature or in a supercritical fluid state, the control device 50 controls the heat source 20 to be opened, and the first heating branch 103 and the second heating branch 104 to be connected, the pressure in the first pressure vessel 11 and the second pressure vessel 12 is increased to a predetermined pressure, and the initialization stage is not finished until all the working substance is in the supercritical fluid state;

obtaining a pressure rise rate in the first pressure vessel 11 and the second pressure vessel 12, or obtaining a pressure in the first pressure vessel 11 and the second pressure vessel 12; and when the pressure rise rate is less than a predetermined rate or the pressure is greater than a predetermined pressure, controlling the heat source 20 to continue providing thermal energy to the working substance in one of the first and second pressure vessels or controlling the cold source 30 to cool the working substance in the other of the first and second pressure vessels, to form a pressure difference between the first pressure vessel 11 and the second pressure vessel 12, or, controlling the heat source 20 to continue providing thermal energy to the working substance in one of the first and second pressure vessels which the heat source serves and controlling the cold source 30 to cool the working substance in the other of the first and second pressure vessels, to form a pressure difference between the first pressure vessel 11 and the second pressure vessel 12.

In some embodiments, during the forming of the pressure difference, a channel between the driven portion 13 and the first pressure vessel 11, and a channel between the driven portion 13 and the second pressure vessel 12 may be connected, so that the working substance is capable of flowing from one pressure vessel to the other pressure vessel through the driven portion 13. That is, during the forming of the pressure difference, a path between the first pressure vessel 11 and the second pressure vessel 12 is connected, the working substance flows from a high-pressure area to a low-pressure area, and the driven portion 13 is driven to operate.

Optionally, during the forming of the pressure difference, the channel between the driven portion 13 and the first pressure vessel 11, and the channel between the driven portion 13 and the second pressure vessel 12 may be disconnected, and the channels may be connected when the pressure difference reaches a predetermined pressure difference. That is, during the forming of the pressure difference, the path between the first pressure vessel 11 and the second pressure vessel 12 is disconnected, the working substance does not flow, and the driven portion 13 stops operation temporarily. When the pressure difference reaches the predetermined pressure difference, the path between the first pressure vessel 11 and the second pressure vessel 12 is connected, the working substance flows from a high-pressure area to a low-pressure area, and the driven portion 13 is driven to operate again. This operation mode is particularly adapted for the situation that the system includes a plurality of pressure vessel groups. In this situation, the heat source and the cold source may serve for each pressure vessel group alternately. The path between the first pressure vessel 11 and the second pressure vessel 12 in each pressure vessel group may be connected alternately to provide power to the driven portion 13 alternately, so as to realize continuous operation of the whole system.

In some embodiments, when the working substance flows from one pressure vessel to the other pressure vessel through the driven portion 13, the method may further include: obtaining a first pressure in the first pressure vessel 11 and a second pressure in the second pressure vessel 12; obtaining a difference between the first pressure and the second pressure; and if the difference is less than a predetermined difference, controlling one of the heat source 20 and the cold source 30 to stop serving the pressure vessel, and the other of the heat source 20 and the cold source 30 to exchange the pressure vessel to be served, to form a reversed pressure difference, or controlling the heat source 20 and the cold source 30 to exchange the pressure vessels they serve to form a reversed pressure difference, which makes the working substance flow reversely if other conditions are met (for example, the reversed pressure difference reaches a predetermined value).

During the process of providing power to the driven portion 13, as the working substance flows from the high-pressure area to the low-pressure area, the pressure difference between the first pressure vessel 11 and the second pressure vessel 12 may become smaller and smaller, and a flowing rate of the working substance may become lower and lower. When the pressure difference is less than a predetermined difference, it is determined that the provided power is not enough. Thus, a new pressure difference needs to be formed between the first pressure vessel 11 and the second pressure vessel 12. If the heat source continues to serve the pressure vessel it served, the temperature and the pressure therein may be increased continuously to cause power consumption of the heat source to be increased. Similarly, if the cold source continues to serve the pressure vessel it served, power consumption of the cold source may be increased. As a result, a ratio of output power to input power of the whole system may be reduced, which cannot meet requirements of EER.

Therefore, in some embodiments, the heat source and the cold source may exchange the pressure vessels they serve, to form a reversed pressure difference between the first pressure vessel 11 and the second pressure vessel 12. This can make full use of an increasing space and a decreasing space of temperature and pressure of each pressure vessel, so as to improve EER.

In some embodiments, whether the heat source and the cold source need to exchange the pressure vessels they serve may be determined by detecting pressure change ratios in each pressure vessel.

Specifically, when the working substance flows from one pressure vessel to the other pressure vessel through the driven portion 13, the method may further include: obtaining a pressure change rate in the first pressure vessel 11 and the second pressure vessel 12; and if the pressure change rate is less than a predetermined change rate, controlling one of the heat source 20 and the cold source 30 to stop serving the pressure vessel, and the other of the heat source 20 and the cold source 30 to exchange the pressure vessel to be served, to form a reversed pressure difference, or controlling the heat source 20 and the cold source 30 to exchange the pressure vessels they serve, to form a reversed pressure difference. The working substance is enabled to flow reversely when other conditions are met (for example, the reversed pressure difference reaches a predetermined value).

Optionally, whether the heat source and the cold source need to exchange the pressure vessels they serve may be determined by detecting practical consuming power (i.e., power consumption per unit time) output to the power cycle loop by the heat pump 22 and the refrigerator group 32.

Specifically, when the working substance flows from one pressure vessel to the other pressure vessel through the driven portion 13, the method may further include: obtaining consuming power of at least one of the heat pump and the refrigerator group; and if the consuming power is larger than a predetermined power, controlling one of the heat source 20 and the cold source 30 to stop serving the pressure vessel, and the other of the heat source 20 and the cold source 30 to exchange the pressure vessel to be served, to form a reversed pressure difference, or controlling the heat source 20 and the cold source 30 to exchange the pressure vessels they serve, to form a reversed pressure difference. The working substance is enabled to flow reversely when other conditions are met (for example, the reversed pressure difference reaches a predetermined value).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A supercritical fluid power system, comprising:
   a power cycle loop filled with a working substance, wherein the working substance is a supercritical fluid when flowing in the power cycle loop, and the power cycle loop comprises a first pressure vessel, a second pressure vessel, and a driven portion disposed between and connected with the first and second pressure vessels; and
   a heat source and a cold source,
   wherein the heat source is configured to provide thermal energy to the working substance in one of the first and second pressure vessels, to increase a pressure in the one pressure vessel, a temperature output by the heat source is higher than a critical temperature of the working substance, and the cold source is configured to cool the working substance in the other of the first and second pressure vessels, to reduce a pressure in the other pressure vessel,
   wherein the heat and cold sources cooperate to form a pressure difference between the first and second pressure vessels, and the working substance flows between the first and second pressure vessels under the effect of the pressure difference, and flows through the driven portion to provide power to the driven portion, and
   wherein the driven portion has an entrance and an exit for transit of the working substance, the first pressure vessel, the second pressure vessel and the driven portion are connected with each other via a first unidirectional branch and a second unidirectional branch, wherein each unidirectional branch is provided for the working substance to flow from the entrance to the exit, and the working substance flows in the first unidirectional branch and the second unidirectional branch alternately according to the pressure difference.

2. The supercritical fluid power system according to claim 1, wherein the heat source comprises:
   a first fluid which is not communicated with the working substance;
   a first heat exchanger comprising a first chamber and a second chamber which are separated from each other, wherein the first chamber is connected with the power cycle loop for the working substance to flow; and
   a heat pump, wherein an output end of the heat pump is connected with the second chamber, and the heat pump is configured to extract thermal energy of the first fluid and transport the extracted thermal energy to the second chamber, so as to exchange heat with the working substance.

3. The supercritical fluid power system according to claim 2, wherein the first fluid is a fluid existing in natural environment.

4. The supercritical fluid power system according to claim 2, wherein when the first fluid is a liquid, a transport pump is provided at an input end of the heat pump to speed the flow of the first fluid to the heat pump.

5. The supercritical fluid power system according to claim 2, wherein the first heat exchanger comprises a heat pipe, a tubular heat exchanger or a plate heat exchanger.

6. The supercritical fluid power system according to claim 1, wherein the cold source comprises:
   a second fluid which is not communicated with the working substance;
   a second heat exchanger comprising a third chamber and a fourth chamber which are separated from each other, wherein the third chamber is connected with the power cycle loop for the working substance to flow; and
   a refrigerator group, wherein an output end of the refrigerator group is connected with the fourth chamber, and the refrigerator group is configured to extract thermal energy of the working fluid and release the extracted thermal energy to the second fluid.

7. The supercritical fluid power system according to claim 6, wherein the second fluid is a fluid existing in natural environment.

8. The supercritical fluid power system according to claim 6, wherein the cold source further comprises a spraying device for cooling a condenser of the refrigerator group.

9. The supercritical fluid power system according to claim 6, wherein the second heat exchanger comprises a heat pipe, a tubular heat exchanger or a plate heat exchanger.

10. The supercritical fluid power system according to claim 6, wherein when the heat source comprises a first fluid, and a heat pump extracting thermal energy of the first fluid, a first channel for flowing of the first fluid is provided between the heat source and the cold source, wherein the first fluid flowing out of the heat source through the first channel serves as the second fluid to flow into the cold source.

11. The supercritical fluid power system according to claim 10, wherein a second channel for flowing of the second fluid is provided between the heat source and the cold source, wherein the second fluid flowing out of the cold source through the second channel serves as supplement of the first fluid to flow into the heat source.

12. The supercritical fluid power system according to claim 1, wherein a control valve is disposed in the first and second unidirectional branches respectively, to control connectivity of the corresponding branch.

13. The supercritical fluid power system according to claim 1, wherein the driven portion is a power generation device or a power transmission device.

14. The supercritical fluid power system according to claim 1, wherein a pressure sensor is disposed in each of the first and second pressure vessels for detecting an inner pressure in the corresponding pressure vessel and outputting a signal of the detected inner pressure.

15. The supercritical fluid power system according to claim 14, further comprising a control device configured to receive the signal of the detected inner pressure output by the pressure sensor and send a first instruction or a second instruction based on the signal of the detected inner pressure, wherein the first instruction controls the heat source to provide thermal energy to the working substance in the first pressure vessel and the cold source to cool the working substance in the second pressure vessel, and the second instruction controls the heat source to provide thermal energy to the working substance in the second pressure vessel and the cold source to cool the working substance in the first pressure vessel.

16. The supercritical fluid power system according to claim 6, wherein the supercritical fluid power system comprises a plurality of first pressure vessels and a plurality of second pressure vessels, wherein each of the plurality of first pressure vessels corresponds to one of the plurality of second pressure vessels to form a plurality of pressure vessel groups each of which comprises one first pressure vessel and one second pressure vessel, and the heat source and the cold source serve for at least one pressure vessel group in a same time period.

17. The supercritical fluid power system according to claim 16, wherein in different time periods, the heat source and the cold source serve for different pressure vessel groups.

18. A method for controlling a supercritical fluid power system, wherein the supercritical fluid power system comprises:
   a power cycle loop filled with a working substance, wherein the working substance is a supercritical fluid when flowing in the power cycle loop, and the power cycle loop comprises a first pressure vessel, a second pressure vessel, and a driven portion disposed between and connected with the first and second pressure vessels; and
   a heat source and a cold source,
   wherein the heat source is configured to provide thermal energy to the working substance in one of the first and second pressure vessels, to increase a pressure in the one pressure vessel, a temperature output by the heat source is higher than a critical temperature of the working substance, and the cold source is configured to cool the working substance in the other of the first and second pressure vessels, to reduce a pressure in the other pressure vessel, and
   wherein the heat and cold sources cooperate to form a pressure difference between the first and second pressure vessels, and the working substance flows between the first and second pressure vessels under the effect of the pressure difference, and flows through the driven portion to provide power to the driven portion,
   wherein the method comprises:
      at an initial time period, controlling the heat source to provide thermal energy to the working substance in the first pressure vessel and the second pressure vessel, so as to convert the working substance in the power cycle loop into a supercritical fluid;
      obtaining a pressure rise rate in the first pressure vessel and the second pressure vessel, or obtaining a pressure in the first pressure vessel and the second pressure vessel; and
      when the pressure rise rate is less than a predetermined rate or the pressure is greater than a predetermined pressure, controlling the heat source to continue providing thermal energy to the working substance in one of the first and second pressure vessels which the heat source serves or controlling the cold source to cool the working substance in the other of the first and second pressure vessels, to form a pressure difference between the first pressure vessel and the second pressure vessel, or
      controlling the heat source to continue providing thermal energy to the working substance in one of the first and second pressure vessels which the heat source serves and controlling the cold source to cool the working substance in the other of the first and second pressure vessels, to form a pressure difference between the first pressure vessel and the second pressure vessel.

19. The method according to claim 18, wherein during the forming of the pressure difference, a channel between the driven portion and the first pressure vessel, and a channel between the driven portion and the second pressure vessel are connected, so that the working substance is capable of flowing from one pressure vessel to the other pressure vessel through the driven portion; or
   during the forming of the pressure difference, the channel between the driven portion and the first pressure vessel, and the channel between the driven portion and the second pressure vessel are disconnected, and the channels are connected when the pressure difference reaches a predetermined pressure difference.

20. The method according to claim 19, wherein when the working substance flows from one pressure vessel to the other pressure vessel through the driven portion, the method further comprises:
   obtaining a first pressure in the first pressure vessel and a second pressure in the second pressure vessel;
   obtaining a difference between the first pressure and the second pressure; and
   if the difference is less than a predetermined difference, controlling one of the heat source and the cold source to stop serving the pressure vessel, and the other of the heat source and the cold source to exchange the pressure vessel to be served, to form a reversed pressure difference, or controlling the heat source and the cold source to exchange the pressure vessels they serve, to form a reversed pressure difference.

21. The method according to claim 19, wherein when the working substance flows from one pressure vessel to the other pressure vessel through the driven portion, the method further comprises:
   obtaining a pressure change rate in the first pressure vessel and the second pressure vessel; and
   if the pressure change rate is less than a predetermined change rate, controlling one of the heat source and the cold source to stop serving the pressure vessel, and the other of the heat source and the cold source to exchange the pressure vessel to be served, to form a reversed pressure difference, or controlling the heat source and the cold source to exchange the pressure vessels they serve, to form a reversed pressure difference.

22. The method according to claim 19, wherein the heat source comprises a heat pump, the cold source comprises a refrigerator group, and when the working substance flows from one pressure vessel to the other pressure vessel through the driven portion, the method further comprises:
   obtaining a practical consuming power of at least one of the heat pump and the refrigerator group; and
   when the practical consuming power is greater than a predetermined power, controlling one of the heat source and the cold source to stop serving the pressure vessel, and the other of the heat source and the cold source to exchange the pressure vessel to be served, to form a reversed pressure difference, or controlling the heat source and the cold source to exchange the pressure vessels they serve, to form a reversed pressure difference.

23. The supercritical fluid power system according to claim 2, wherein when the first fluid is a gas, a fan is provided at an input end of the heat pump to speed the flow of the first fluid to the heat pump.

* * * * *